US009153241B2

(12) United States Patent
Miyasaka et al.

(10) Patent No.: US 9,153,241 B2
(45) Date of Patent: Oct. 6, 2015

(54) SIGNAL PROCESSING APPARATUS

(75) Inventors: Shuji Miyasaka, Osaka (JP); Michihiro Matsumoto, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 1544 days.

(21) Appl. No.: 12/438,996

(22) PCT Filed: Nov. 29, 2007

(86) PCT No.: PCT/JP2007/073054
§ 371 (c)(1),
(2), (4) Date: Feb. 26, 2009

(87) PCT Pub. No.: WO2008/066114
PCT Pub. Date: Jun. 5, 2008

(65) Prior Publication Data
US 2009/0207775 A1    Aug. 20, 2009

(30) Foreign Application Priority Data
Nov. 30, 2006  (JP) ................................. 2006-323383

(51) Int. Cl.
H04W 4/00        (2009.01)
G10L 19/16       (2013.01)
(Continued)

(52) U.S. Cl.
CPC .............. *G10L 19/167* (2013.01); *G10L 21/038* (2013.01); *G11B 2020/00028* (2013.01); *H04Q 11/0428* (2013.01)

(58) Field of Classification Search
CPC ................ G11B 2020/00028; H04Q 11/0428; H04L 12/52; H04J 3/1611; G10L 21/038; G10L 19/167
See application file for complete search history.

(56) References Cited

U.S. PATENT DOCUMENTS 6,240,140 B1 *  5/2001  Lindbergh et al. ............ 375/260
6,954,460 B2 * 10/2005  DeMars ........................ 370/392
(Continued)

FOREIGN PATENT DOCUMENTS

JP    11-066737     3/1999
JP    2001-283569   10/2001
(Continued)

OTHER PUBLICATIONS

International Search Report issued Jan. 15, 2008 in the International (PCT) Application of which the present application is the U.S. National Stage.
(Continued)

*Primary Examiner* — Hassan Phillips
*Assistant Examiner* — Lonnie Sweet
(74) *Attorney, Agent, or Firm* — Wenderoth, Lind & Ponack, L.L.P.

(57) ABSTRACT

The signal processing apparatus inserts the header information in a frame to probably be the reproduction start point by including: the first and the second coding units that code an input signal per frame; the first header inserting unit that inserts the SBR header indicating management information of the coded signal represented by a sequence of frames, in each frame at a regular interval within the coded signal; the control unit that determines a frame in which the SBR header is inserted, independent of the frames in which the first header inserting unit inserts the SBR header; and the second header inserting unit that singly inserts the SBR header in the frame determined by the control unit.

8 Claims, 13 Drawing Sheets

(51) Int. Cl.
*G10L 21/038* (2013.01)
*H04Q 11/04* (2006.01)
*G11B 20/00* (2006.01)

(56) References Cited

U.S. PATENT DOCUMENTS

| | | | |
|---|---|---|---|
| 2003/0091338 A1* | 5/2003 | Snow et al. | 386/96 |
| 2004/0165665 A1* | 8/2004 | Harumoto et al. | 375/240.26 |
| 2005/0047351 A1* | 3/2005 | Orsic | H04L 69/163 370/254 |
| 2005/0234714 A1* | 10/2005 | Takagi et al. | 704/225 |
| 2005/0254640 A1* | 11/2005 | Ohki et al. | 379/406.1 |
| 2006/0215707 A1* | 9/2006 | Tsai et al. | 370/535 |
| 2006/0235678 A1* | 10/2006 | Kim et al. | 704/200.1 |
| 2007/0146503 A1* | 6/2007 | Shiraki | 348/231.3 |
| 2007/0156739 A1* | 7/2007 | Black et al. | 707/102 |

FOREIGN PATENT DOCUMENTS

| | | |
|---|---|---|
| JP | 2004-101638 | 4/2004 |
| JP | 2004-227719 | 8/2004 |
| JP | 2006-106475 | 4/2006 |

OTHER PUBLICATIONS

MPEG Standard, (ISO/IEC 14496-3:2005(E)).

English machine translation of JP 11-066737, Mar. 1999.

* cited by examiner

FIG. 6

| Syntax | No. of bits | Mnemonic |
|---|---|---|
| sbr_header() | | |
| { | | |
| bs_amp_res; | 1 | |
| bs_start_freq; | 4 | uimsbf, Note 1 |
| bs_stop_freq; | 4 | uimsbf, Note 1 |
| bs_xover_band; | 3 | uimsbf, Note 2 |
| bs_reserved; | 2 | uimsbf |
| bs_header_extra_1; | 1 | |
| bs_header_extra_2; | 1 | |
| | | |
| if(bs_header_extra_1){ | | |
| bs_freq_scale; | 2 | Note 3 |
| bs_after_scale; | 2 | uimsbf |
| bs_noise_bands; | 1 | |
| } | 2 | uimsbf |
| | | |
| if(bs_header_extra_2){ | | |
| bs_limiter_bands; | 2 | Note 3 |
| bs_limiter_gains; | 2 | uimsbf |
| bs_interpol_freq; | 1 | uimsbf |
| bs_smoothing_mode; | 1 | |
| } | | |
| } | | |

Change point between tunes — SBR Header

SIGNAL PROCESSING APPARATUS

TECHNICAL FIELD

The present invention relates to a signal processing apparatus that performs compression coding on an audio signal by dividing the audio signal into layers. For example, the present invention relates to a signal processing apparatus which performs compression coding on a signal in a lower frequency band, using an Advanced Audio Coding (AAC) method in a main layer, and which performs compression coding on a signal in a higher frequency band, using a Spectral Band Replication (SBR) method in a sub-layer as in the MPEG AAC-SBR method.

BACKGROUND ART

In recent years, audio players that use semiconductor memories as recording media have been developed. In many cases, encoders perform compression coding on music contents stored in advance in recording media, such as a CD, and the music contents are stored in semiconductor memories (CD ripping). Then, decoders reproduce the compressed audio contents stored in the semiconductor memories so that users of the audio players can enjoy music.

In these cases, the encoders need to have the following characteristics in view of the user's convenience, such as: (1) a lower bit rate in compression coding; and (2) faster processing speed in compression coding. The lower bit rate in compression coding allows even an inexpensive recording medium having a smaller recording capacity to record data for a long period of time. Furthermore, the faster processing speed in compression coding makes it possible to code many tunes within a shorter period of time.

In recent years, the MPEG AAC-SBR method (ISO/IEC14496-3) has been standardized as a coding method characterized by using a lower bit rate. FIG. 1 illustrates the basic principle of compression coding according to the AAC-SBR method. According to the AAC-SBR method, compression coding is performed on a signal in a lower frequency band, using the AAC method in a main layer (left side in FIG. 1), and compression coding is performed on a signal in a higher frequency band, using the SBR method in a sub-layer (right side in FIG. 1). Here, the SBR method is a method of replicating, modifying, and shaping a signal in a lower band. Thus, the SBR part in FIG. 1 can be coded at a very low bit rate.

FIG. 2 illustrates the basic structure of a bit stream according to the AAC-SBR method. An AAC part (AAC data) and an SBR part (SBR data) are stored in each of audio frames divided at predetermined time intervals, and header information (AAC header and SBR header) is placed at the head of each of the audio frames. Here, as long as an SBR header that is a header of the SBR part is inserted once every several frames, the SBR header does not necessarily have to be present in each audio frame in view of reduction in a bit rate. The MPEG standard suggests insertion of an SBR header 2 times per second. The reason of such regular insertion is as follows. When the aforementioned methods are used in broadcasting, for example, input in a decoder does not always start from the head of a bit stream. Under such a condition, when an SBR header is inserted only in a head of a bit stream but SBR headers are not inserted at regular intervals, the SBR part cannot be reproduced to the end of the bit stream. Similarly, reproduction of a bit stream stored in advance does not start from the head of the bit stream. For example, in the case of reproduction from a 40-second time point, the SBR part cannot be reproduced without regular insertion of the SBR headers.

In order to accelerate the compression coding, a great many techniques that cause encoders to perform faster processing have been developed. Since these techniques are out of the scope of the present invention, the description is omitted here. On the other hand, several processing methods have been devised in view of the acceleration of the compression coding in an encode system. FIG. 3 illustrates a system configuration for processing music signals in a CD at faster speed.

First, a music signal stored in a CD is transmitted to an input pulse code modulation (PCM) buffer. Next, a signal processor, that is a digital signal processor (DSP) obtains the music signal from the input PCM buffer, and performs compression coding on the music signal. The resulting bit stream obtained by the compression coding is stored through an output bit stream buffer in an external memory, such as a SD memory card. The series of operations are controlled by a microcomputer controller. For example, when music signals that are stored in the CD and that correspond to 10 tunes are coded, the music signals are sequentially inputted into the input PCM buffer without any interval between the tunes. Accordingly, the signal processor sequentially codes the music signals without detecting an interval between the tunes. Such processing is performed when the signal processor sequentially codes one long tune corresponding to 10 tunes in a length of time. The resulting output bit stream coded and stored in the output bit stream buffer is divided, according to the tune length information originally stored in the CD (minutes and seconds), into tunes, such as into the first track and the second track (See Patent Reference 1). Such processing is performed because coding several tunes at one time enables the signal processor to perform processing faster than coding tunes one-by-one.

Patent Reference 1: Japanese Unexamined Patent Application Publication No. 2004-101638

SUMMARY OF THE INVENTION

Problems that Invention is to Solve

However, there is a problem that the SBR header is not always inserted in each head of the tunes when the AAC-SBR method is used as a coding method in the aforementioned conventional case.

FIG. 4 explanatorily illustrates a problem occurring when music signals stored in a CD are sequentially coded using the AAC-SBR method, without detecting an interval between the tunes. (a) in FIG. 4 illustrates that 1 CD stores 4 tunes. (b) in FIG. 4 illustrates an enlarged view that exemplifies a structure of a bit stream between the first tune and the second tune, as one example. As described above, the signal processor performs compression coding on inputted music signals without detecting an interval between tunes. Thus, when the SBR headers are only inserted at regular intervals, the SBR headers are not always inserted in the head of the tunes. Obviously, when the SBR header is inserted in every frame, such problem will not occur. However, such insertion is out of the scope of the AAC-SBR method that intends to lower a bit rate as much as possible because the bit rate increases according to the count of the SBR headers.

However, the SBR header includes description of information indicating application of SBR processing to signals in frequency bands. Thus, in the case of no insertion of the SBR header in the head of a tune, the SBR part cannot be processed until the SBR header is first detected from the head of the tunes. As a result, there occurs a problem that signals corresponding to a reproduced sound are in a state as illustrated in (c) in FIG. 4.

(c) in FIG. 4 illustrates spectra of reproduced signals when the SBR header is not inserted in the head of a tune. Here, the horizontal axis shows time, the vertical axis shows a frequency, and the length of each line shows a width of a frequency band of a reproduced signal. In other words, the longer line shows that the reproduced signal is reproduced in a wider frequency band. Furthermore, the shorter line shows that the reproduced signal is reproduced in a narrower frequency band. As obvious from the illustration, when the SBR header is not inserted in the head of a tune, there is a problem that the SBR part each indicated with a dotted oval figure cannot be processed until detecting the SBR header from the head of the tune, and that a signal in a higher frequency band cannot be reproduced.

The present invention has been conceived in view of such conventional problems. Furthermore, the present invention has an object of providing a signal processing apparatus that generates a bit stream capable of reproducing a high quality sound signal from a start time point of the reproduction, even when reproducing, from some midpoint, the bit stream obtained by coding music signals sequentially inputted without an interval between the tunes.

Means to Solve the Problems

In order to solve the problems, the signal processing apparatus according to the present invention includes: a coding unit configured to code an input signal on a per frame basis; a first header inserting unit configured to insert a header in each frame at a regular interval within a coded signal, the coded signal being generated through coding the input signal by the coding unit and being represented by a sequence of frames, and the header indicating management information of the coded signal; a control unit configured to determine a frame in which the header is to be inserted, independent of the frames in which the first header inserting unit inserts the header; and a second header inserting unit configured to singly insert the header in the frame determined by the control unit. With this configuration, the signal processing apparatus can insert a header in a frame as necessary while preventing a bit rate from increasing due to insertion of a header in each frame.

The first header inserting unit may insert, from the frame in which the second header inserting unit has inserted the header, the header in each frame at the regular interval, upon insertion of the header by the second header inserting unit. With this configuration, even when reproduction is started from a part in which the second header inserting unit does not insert a header, coded signals represented by the headers inserted at regular intervals by the first inserting unit can be reproduced.

Furthermore, the first header inserting unit may include a counter that updates a value in each frame, and insert the header when the value indicated by the counter reaches a predetermined preset value, and the second header inserting unit may insert the header in the frame determined by the control unit, using the first header inserting unit by forcibly rewriting the value indicated by the counter to the preset value in the frame determined by the control unit. With this configuration, the first and second header inserting units can be implemented by less use of computational resources.

Furthermore, the control unit may determine a frame in which the header is inserted according to a state of the input signal. With this configuration, the timing when the header is singly inserted can be determined according to a state of the input signal.

The control unit may determine a frame in which the header is inserted according to a control signal provided from an outside of the signal processing apparatus. With this configuration, the timing when the header is singly inserted can be determined according to the control signal provided from the outside.

Furthermore, the coding unit may sequentially code music signals of tunes included in the input signal, and the control unit may determine insertion of the header in a frame within the coded signal, the frame corresponding to a change point between the tunes included in the input signal. With this configuration, the header can be inserted in a change point between tunes when music signals of the tunes to be sequentially inputted are coded.

The control unit may determine, within the coded signal, insertion of the header in a frame in which the input signal has an amplitude smaller than a threshold. With this configuration, the header can be inserted in a frame in which the amplitude of the input signal is smaller, in other words, in a change point between tunes or in a change point of details of the input signal.

The control unit may determine insertion of the header in a frame in which an amplitude of the input signal changes from being smaller than a threshold to being not less than the threshold. With this configuration, the header can be inserted in a frame in which the amplitude of the input signal changes from being smaller to being larger, in other words, in a frame corresponding to the head of a tune.

Furthermore, the control unit may determine insertion of the header in a frame in which the input signal has an amplitude not less than a threshold, after the input signal has the amplitude smaller than the threshold for a predetermined period of time. With this configuration, the header can be inserted in a frame in which the amplitude of the input signal becomes a larger amplitude after the amplitude is smaller for a predetermined period of time, in other words, in a frame corresponding to the head of a tune.

The control unit may include a melody variation detecting unit configured to detect variation in a melody of the input signal, and the control unit may determine insertion of the header in a frame within the coded signal, the frame corresponding to a position detected by the melody variation detecting unit as a position indicating that the melody of the input signal varies. With this configuration, the header can be inserted in a frame corresponding to a part in which the melody varies.

The control unit may determine insertion of the header in a frame within the coded signal, the frame corresponding to a head of a "sabi (the most attractive)" part in the input signal, and the "sabi" part being detected by the melody variation detecting unit. With this configuration, the header can be inserted in the "sabi" part in the tune.

Furthermore, the first header inserting unit and the second header inserting unit may insert a header indicating management information of auxiliary data for expanding a frequency band of the coded signal for reproduction. With this configuration, the header indicating the management information of auxiliary data for expanding a frequency band of the coded signal for reproduction can be inserted.

The first header inserting unit and the second header inserting unit may insert an SBR header according to an MPEG AAC-SBR method, and the first header inserting unit and the second header inserting unit may insert a header indicating management information of auxiliary data for enlarging channels of the coded signal for reproduction.

The first header inserting unit and the second header inserting unit may insert the header which: indicates the management information of auxiliary data for enlarging channels of the coded signal for reproduction; and includes coding mode information indicating a coding method for coding Interchannel Intensity Differences.

The first header inserting unit and the second header inserting unit may insert the header which: indicates the management information of auxiliary data for enlarging channels of the coded signal for reproduction; and includes coding mode information indicating a coding method for coding Interchannel Coherence.

The coding unit may include an amplitude detecting unit configured to detect an amplitude of the input signal, and the control unit may determine a frame in which the header is inserted according to the amplitude of the input signal, the amplitude being detected by the coding unit. With this configuration, the control unit can determine in which frame the header is inserted with less use of computational resources.

The header inserted by the first header inserting unit may have a value same as a value of the header inserted by the second header inserting unit. With this configuration, an area in which a value of the header is stored can be reduced.

Furthermore, the present invention can be achieved not only as an apparatus but also: as a method having the processing units of the apparatus as steps; as a program causing a computer to execute such steps; as a computer-readable recording medium on which the program is recorded, such as a CD-ROM; as information indicating the program; and as data or signals. Such a program, information, data, and signals may be distributed via a communication network, such as the Internet.

Effects of the Invention

The signal processing apparatus according to the present invention can insert a header in a frame as necessary while preventing a bit rate from increasing due to insertion of a header in each frame.

Figure 1:
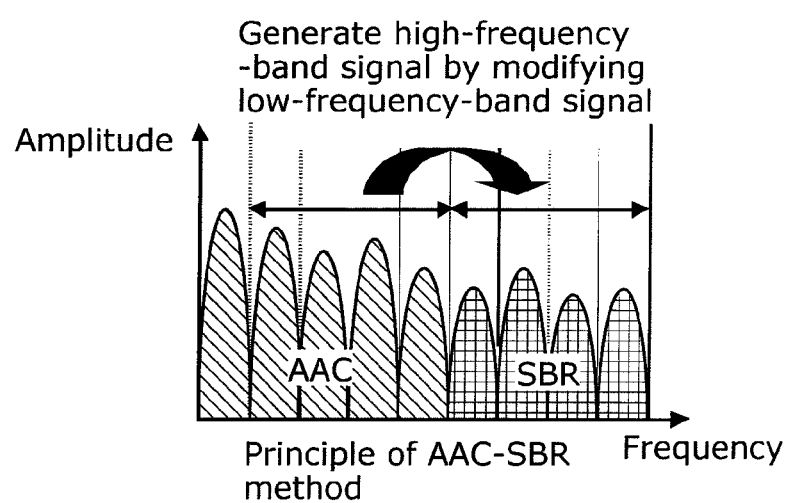
FIG. 1 illustrates the basic principle of compression coding according to the AAC-SBR method.
Figure 2:
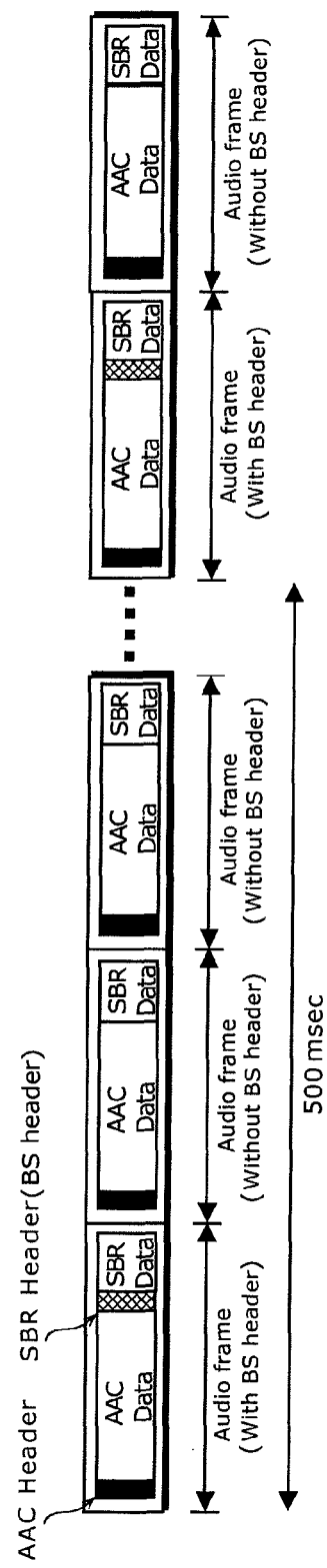
FIG. 2 illustrates the basic structure of a bit stream according to the AAC-SBR method.
Figure 3:
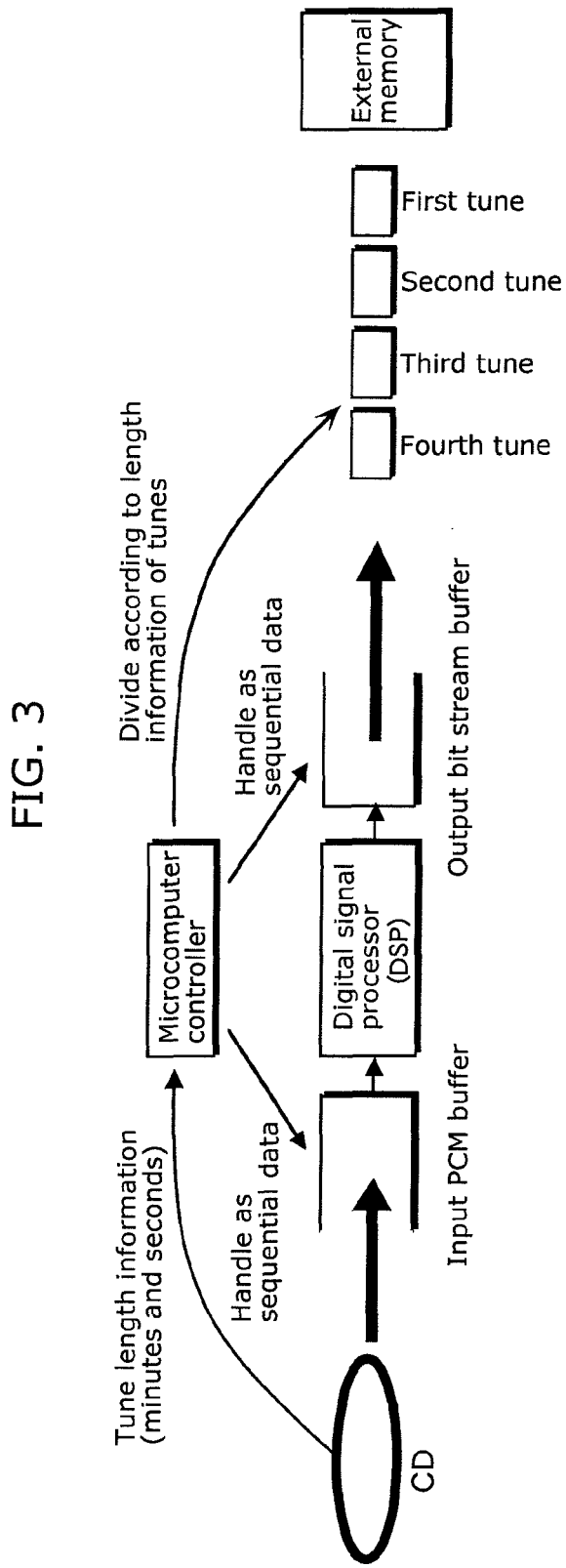
FIG. 3 illustrates a system configuration for processing music signals in a CD at faster speed.
Figure 4:
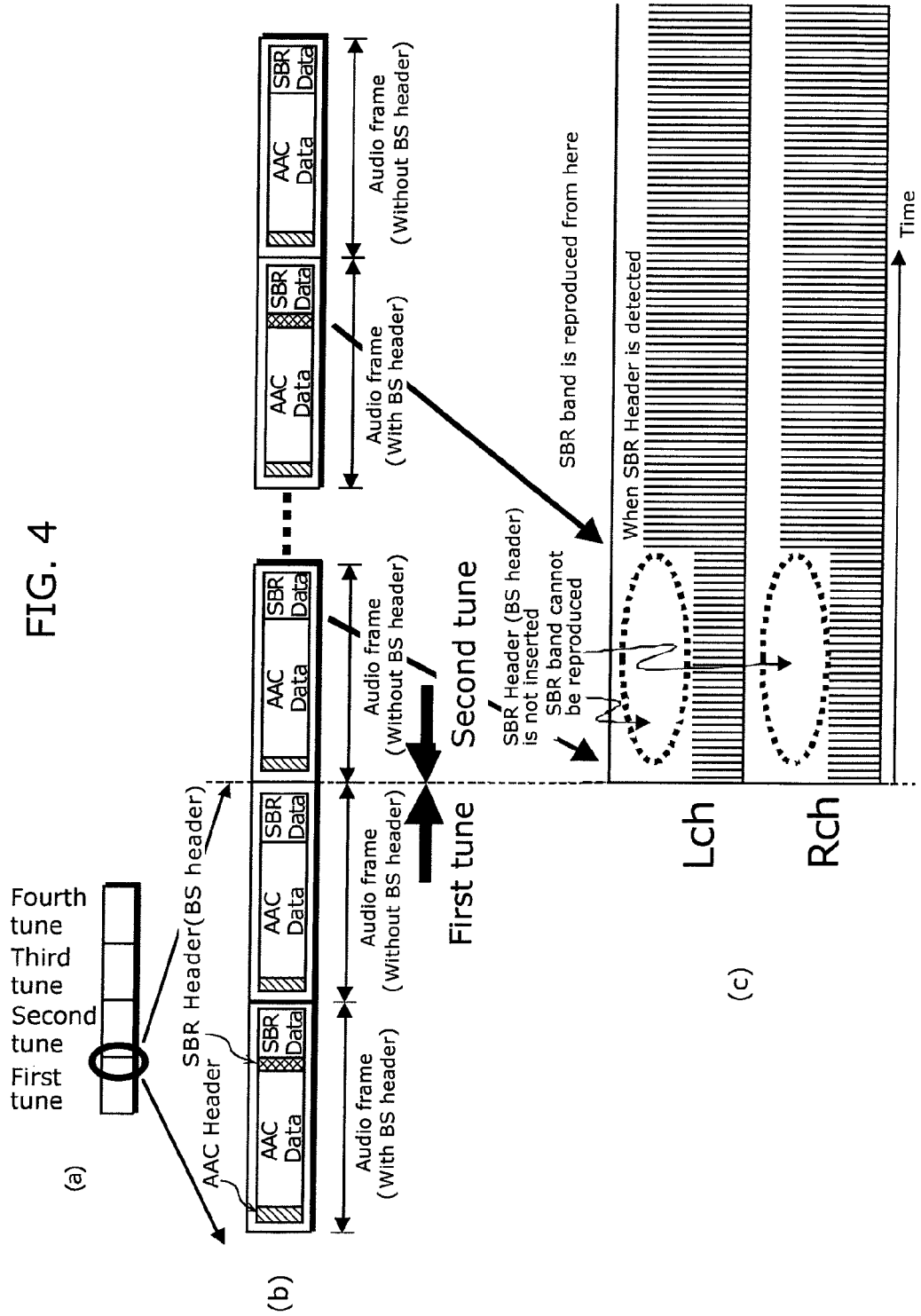
Figure 5:
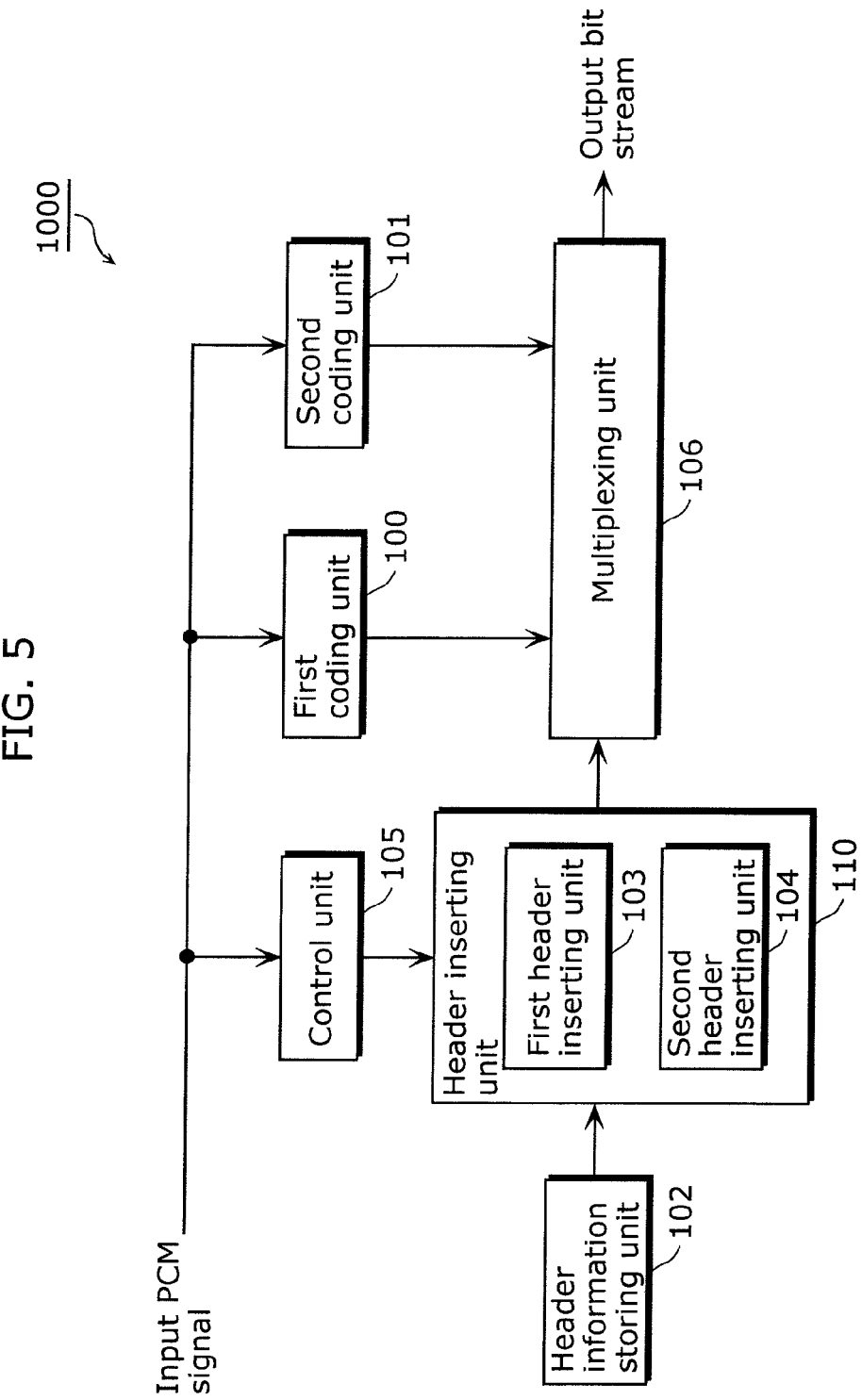
Figure 7:
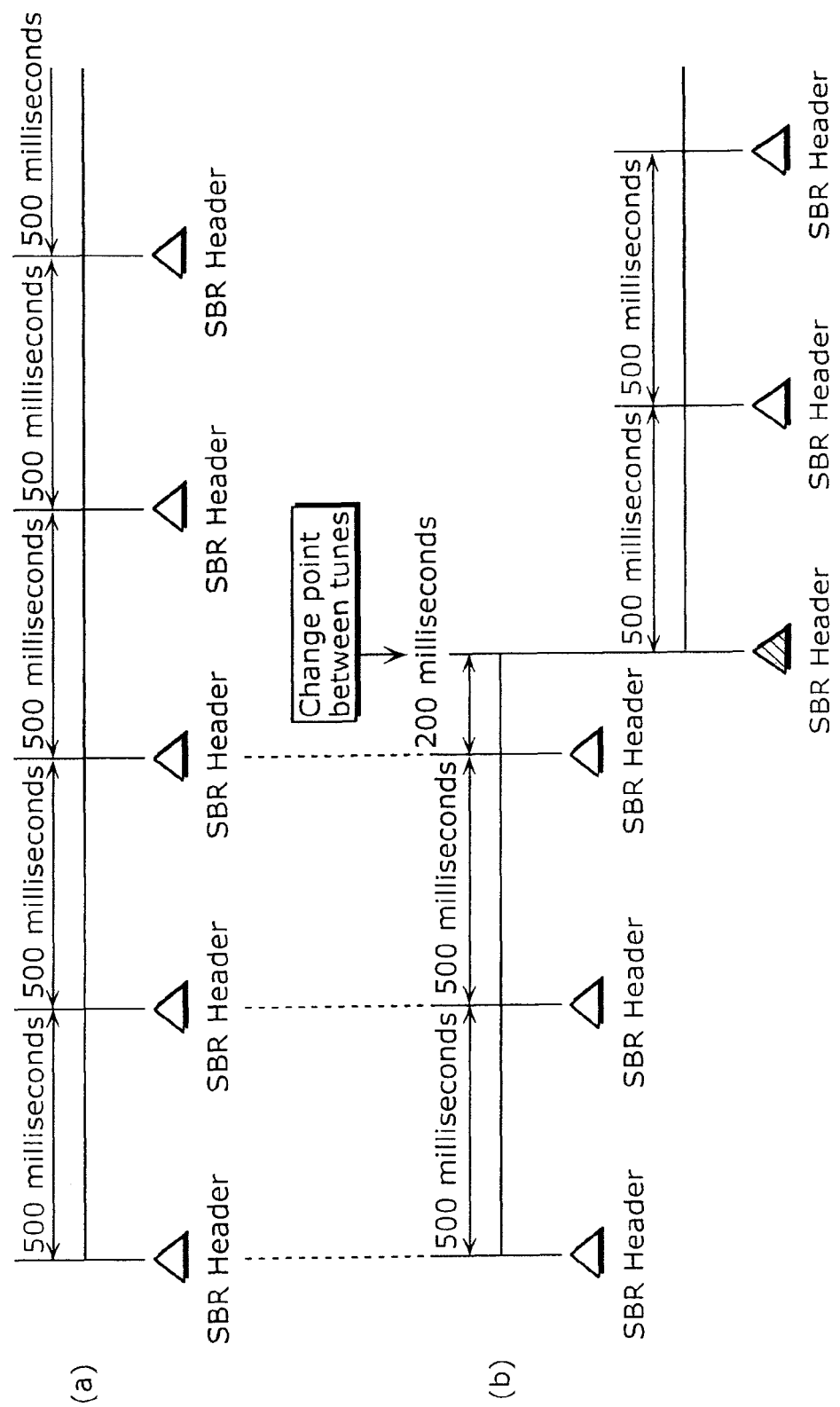
Figure 8:
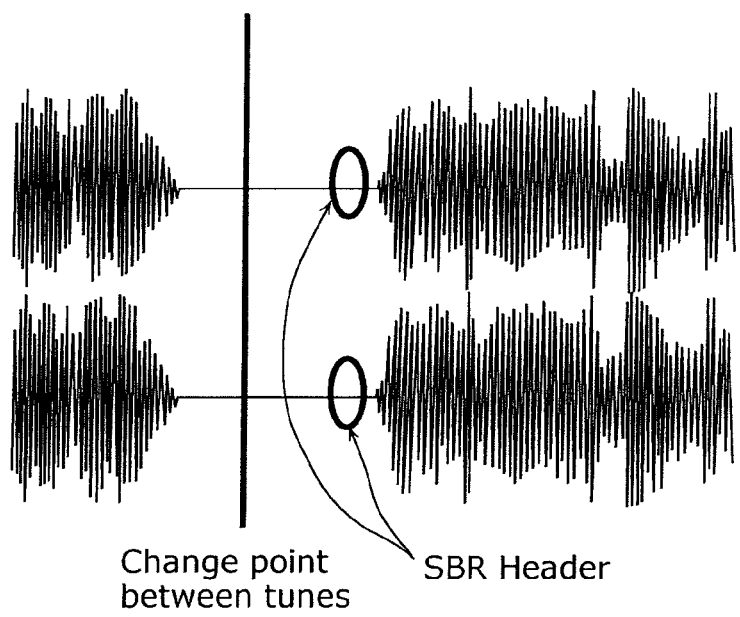
Figure 9:
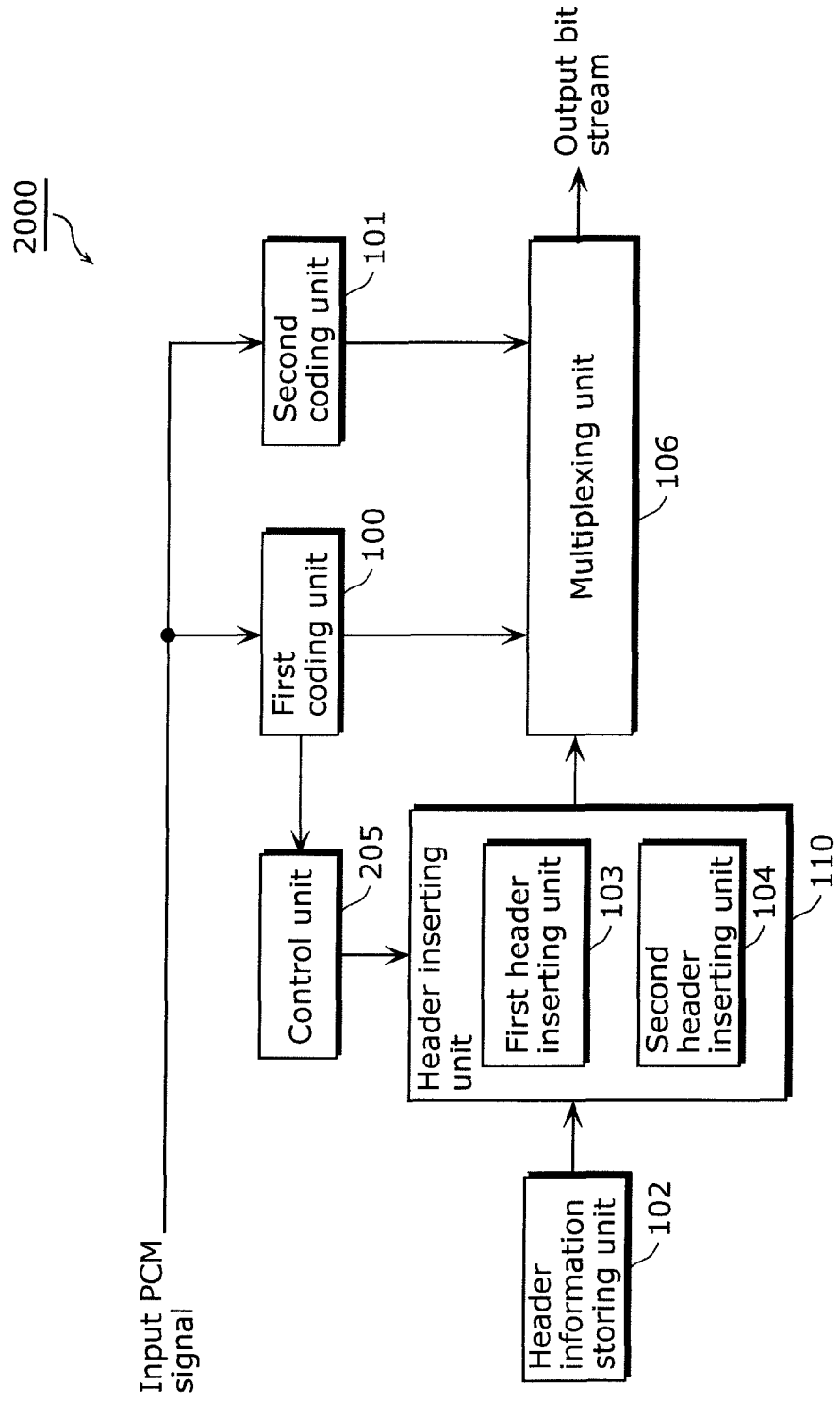
Figure 10:
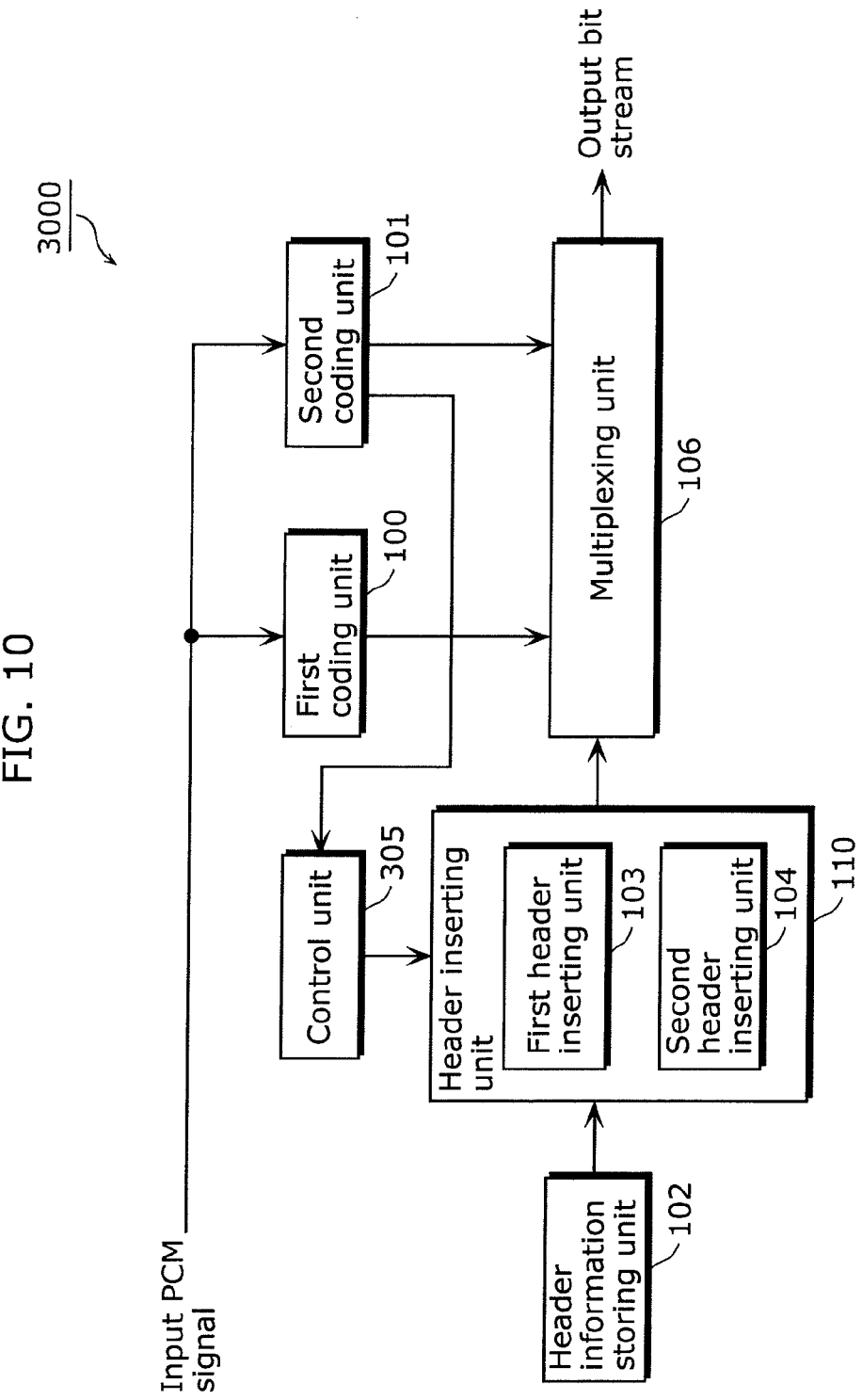
Figure 11:
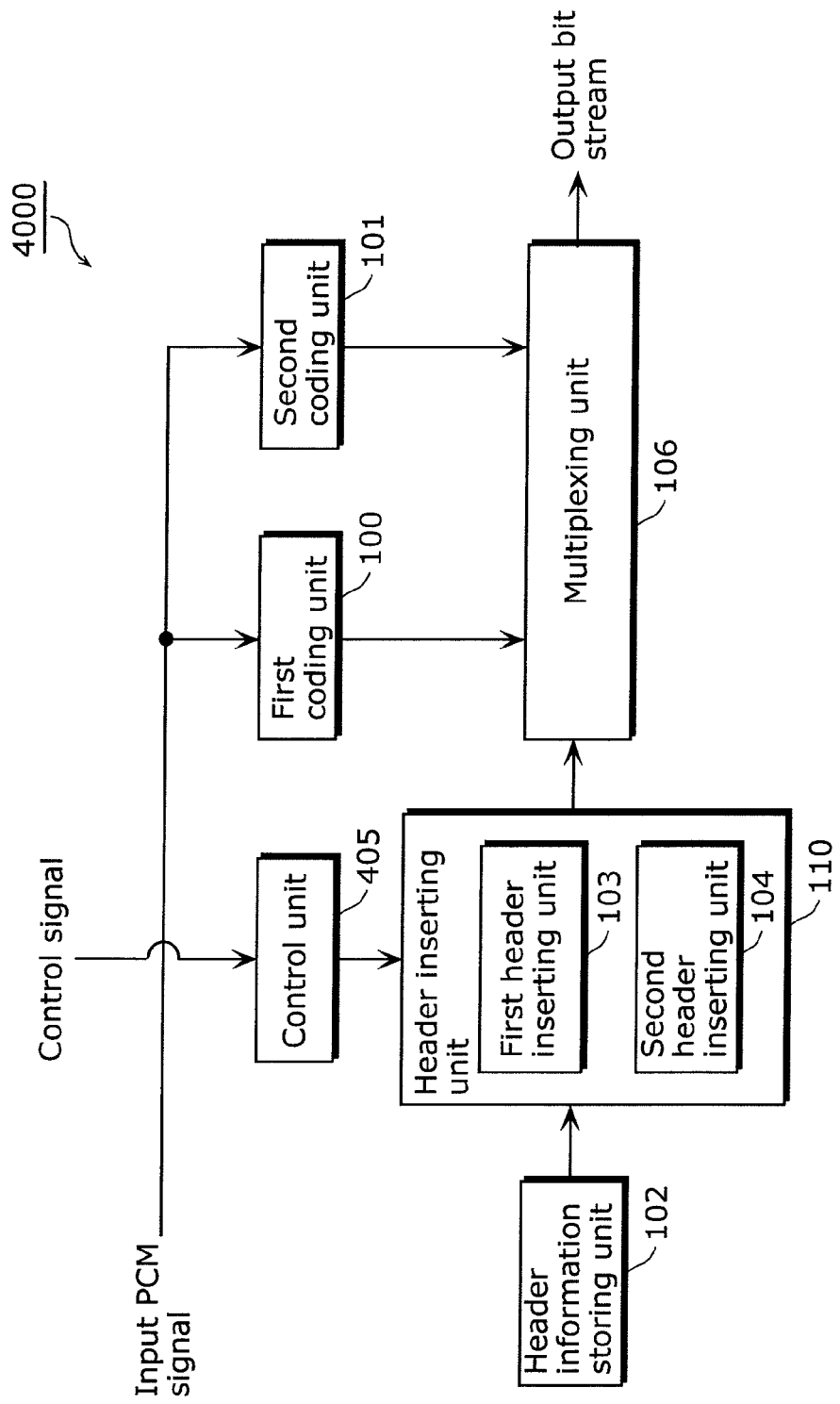
Figure 12:
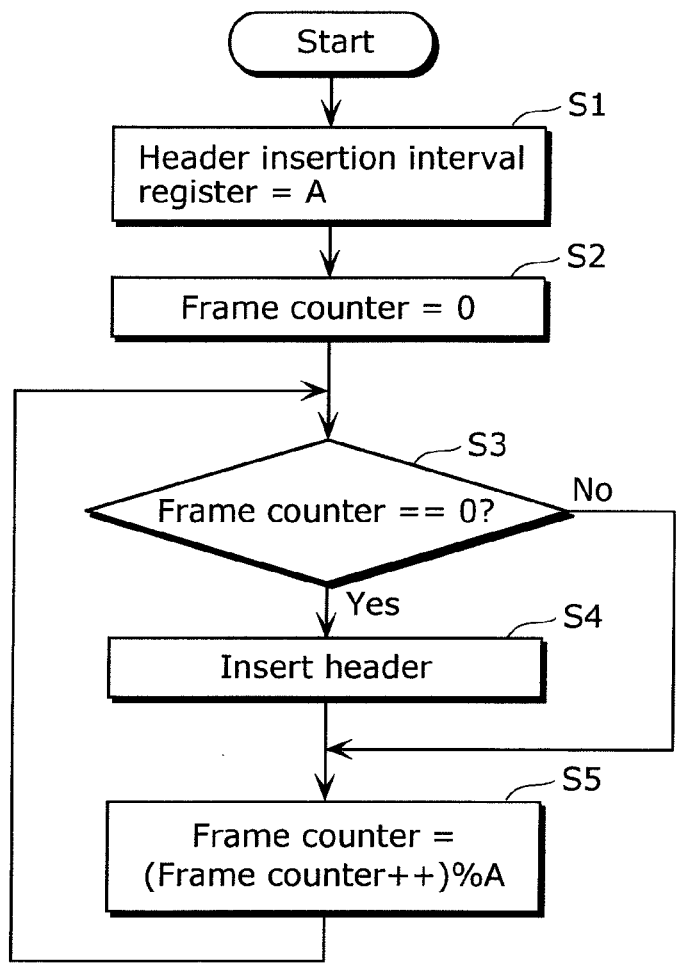
Figure 13:
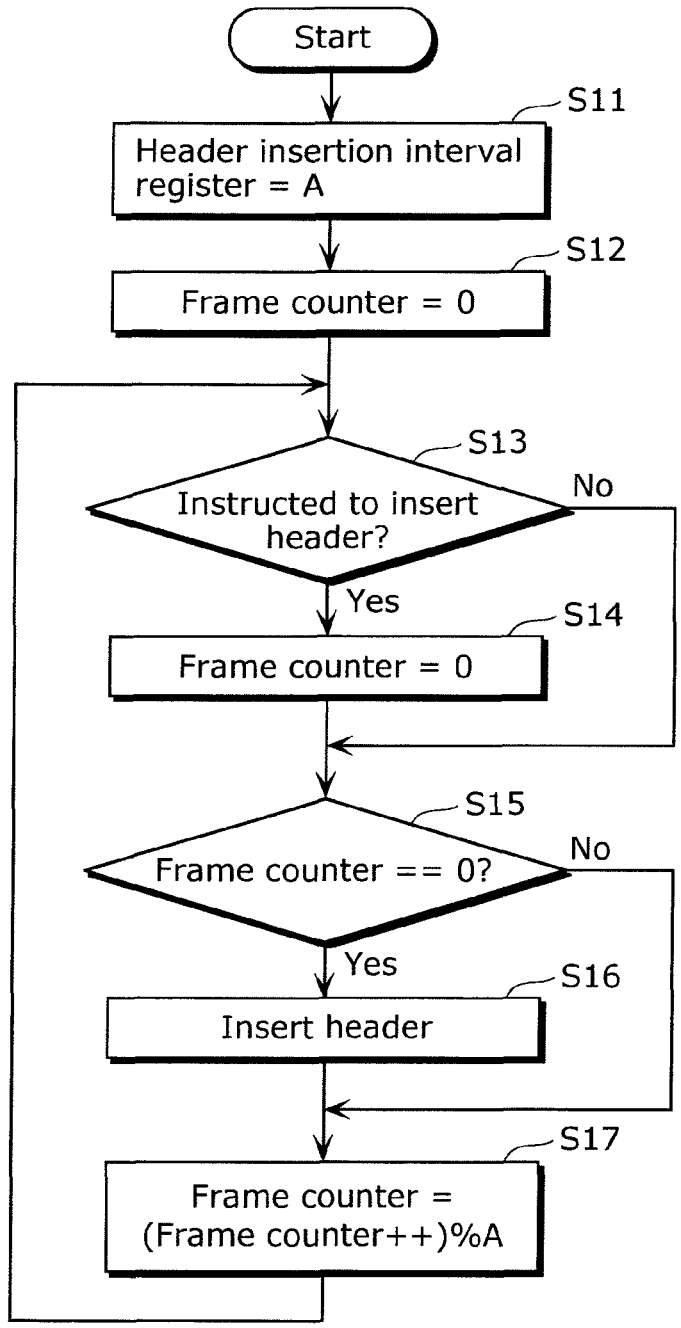

(a) in FIG. 4 illustrates that 1 CD stores 4 tunes, (b) in FIG. 4 illustrates an enlarged view that exemplifies a structure of a bit stream between the first tune and the second tune, as one example, and (c) in FIG. 4 illustrates spectra of reproduced signals when the SBR header is not inserted in the head of a tune;

FIG. 5 illustrates a configuration of the signal processing apparatus 1000 according to Embodiment 1;

FIG. 6 shows details of sbr_header( )" of the MPEG standard;

(a) in FIG. 7 schematically illustrates a part of a coded signal having the SBR headers inserted by the first header inserting unit at regular intervals, and (b) in FIG. 7 schematically illustrates a part of a coded signal having the SBR header singly inserted in a beginning part of the next tune by the second header inserting unit when the current tune is changed to the next one;

FIG. 8 is a waveform diagram illustrating an example of a change point between tunes in a stereo input PCM signal;

FIG. 9 illustrates a configuration of the signal processing apparatus 2000 that determines, according to a signal generated in the arithmetic processes in the first coding unit, a part in which the SBR header is inserted;

FIG. 10 illustrates a configuration of the signal processing apparatus 3000 that determines, according to a signal generated in the arithmetic processes in the second coding unit, a part in which the SBR header is inserted;

FIG. 11 illustrates a configuration of the signal processing apparatus 4000 that determines, according to a control signal provided from the outside, a part in which the SBR header is inserted;

FIG. 12 is a flow chart showing the operations of the first header inserting unit; and FIG. 13 is a flow chart showing the operations of the first and second header inserting units.

NUMERICAL REFERENCES

100 First coding unit
101 Second coding unit
102 Header information storing unit
103 First header inserting unit
104 Second header inserting unit
105, 205, 305, 405 Control unit
106 Multiplexing unit
110 Header inserting unit
1000, 2000, 3000, 4000 Signal processing apparatus

DETAILED DESCRIPTION OF THE INVENTION

Embodiment 1

A signal processing apparatus according to Embodiment 1 of the present invention will be hereinafter described with reference to drawings.

FIG. 5 illustrates a configuration of a signal processing apparatus 1000 according to Embodiment 1. The signal processing apparatus 1000 is a signal processing apparatus that generates a coded signal including a first coded signal and a second coded signal. The first coded signal is a coded signal obtained by coding an audio signal in a narrow band using the MPEG AAC method. On the other hand, the second coded signal is a coded signal obtained by coding a signal for expanding a frequency band of a signal obtained by decoding the first signal, and is a coded signal in an SBR part according to the MPEG AAC-SBR method.

In FIG. 5, the signal processing apparatus 1000 includes a first coding unit 100, a second coding unit 101, a header information storing unit 102, a header inserting unit 110, a control unit 105, and a multiplexing unit 106. The control unit 105 detects a change point between tunes from change in an amplitude of an input PCM signal, and a second header inserting unit 104 inserts an SBR header in a head of a next tune. Furthermore, the header inserting unit 110 includes a first header inserting unit 103 and the second header inserting unit 104. The first coding unit 100 codes an input PCM signal in a lower frequency band. The second coding unit 101 codes an input PCM signal in a higher frequency band. The input PCM signal is, for example, music data obtained by playback of one CD. The header information storing unit 102 stores management information of the second coded signal generated by the second coding unit 101. The header inserting unit 110 is an example of the first header inserting unit and the second header inserting unit that insert management information of auxiliary data for expanding a frequency band of the coded signal for reproduction, in other words, the first header inserting unit and the second header inserting unit that insert an SBR header using the MPEG AAC-SBR method and that insert the SBR header that is the management information of the second coded signal stored by the header information storing unit 102, in the head of the second coded signal. The first header inserting unit 103 inserts a header indicating the management information in a coded signal, at a regular interval, for example, in every 500 milliseconds. Here, the intervals of inserting the headers in the coded signal by the first header inserting unit 103 are not necessarily 500 milliseconds, but may be 300 milliseconds, or different intervals. The second header inserting unit 104 singly inserts a header in a frame determined by the control unit 105. The control unit 105 determines in which frame of the coded signal the SBR header is inserted, using the second header inserting unit 104. The multiplexing unit 106 multiplexes the first coded signal generated by the first coding unit 100, the second coded signal generated by the second coding unit 101, an AAC header, and, if any, the SBR header inserted by one of the first header inserting unit 103 and the second header inserting unit 104.

The operations of the signal processing apparatus 1000 having the aforementioned configuration will be hereinafter described with reference to the drawings.

First, the first coding unit 100 codes an input PCM signal in a lower frequency band, for example, a signal in a band not more than a frequency of 8 kHz. Although the first coding unit 100 codes a signal in a lower frequency band using the MPEG AAC method in Embodiment 1, the coding method is not limited to the AAC method but other methods may be used. Furthermore, although the first coding unit 100 codes a signal limited to 8 kHz of the frequency band at most in Embodiment 1, other frequency bands may be used.

The second coding unit 101 codes a signal for expanding a frequency band of a signal obtained by decoding a coded signal generated by the first coding unit 100. Although Embodiment 1 aims at processing an SBR part using the MPEG AAC-SBR method, the method is not limited to the MPEG AAC-SBR method, but other methods may be used. The first coding unit 100 and the second coding unit 101 are examples of the coding unit that codes an input signal on a per frame basis. Furthermore, the first coding unit 100 and the second coding unit 101 are examples of the coding unit that sequentially codes music signals of tunes included in the input signal.

The header information storing unit 102 is a memory that stores information to be described in the SBR header according to the AAC-SBR method. FIG. 6 is an excerpt from "Table4.1-Syntax of sbr_header( )" of the MPEG standard (ISO/IEC 14496-3:2005(E)) (Non-patent Reference 1). Since ISO/IEC 14496-3:2005(E) details this table, the description is omitted herein. To be short, the SBR header includes quantization resolution of a coded signal in the SBR processing and information indicating that the SBR processing is applied to a signal in which frequency band. Such information is normally set according to a sampling frequency of an input signal and a bit rate of an output bit stream, independent of momentary characteristics of an input PCM signal. Thus, the information has only to be stored in the header information storing unit 102 in advance. In other words, the information set in the aforementioned manner proves, as an example, that the header inserted by the first header inserting unit 103 has a value same as a value of the header inserted by the second header inserting unit 104.

The control unit 105 is an example of a control unit that determines a frame in which the header is inserted, independent of a frame in which the first header inserting unit 103 is inserted, and is an example of a control unit that determines a frame in which the header is inserted according to a state of an input signal. In other words, the control unit 105 controls when and in which frame the SBR header is inserted by checking the change in the amplitude of the input PCM signal. (a) in FIG. 7 schematically illustrates a part of a coded signal having the SBR headers inserted by the first header inserting unit 103 at regular intervals. (b) in FIG. 7 schematically illustrates a part of a coded signal having the SBR header singly inserted in a beginning part of the next tune by the second header inserting unit 104 when the current tune is changed to the next one. Here, the first header inserting unit 103 is an example of the first header inserting unit that inserts a header indicating management information of a coded signal generated through coding by the coding unit, in each frame at a regular interval within the coded signal that is represented by a sequence of frames, and inserts header information at predetermined frame periods. The second header inserting unit 104 is an example of the second header inserting unit that singly inserts the header in a frame determined by the control unit, and that singly inserts header information. Furthermore, the control unit 105 is an example of the control unit that determines insertion of the header in a frame within the coded signal. The frame corresponds to a change point between the tunes in the input signal. (a) in FIG. 7 illustrates that the SBR headers are inserted at regular intervals of every 500 milliseconds by the first header inserting unit 103. In contrast, (b) in FIG. 7 illustrates that the SBR header is inserted after 200 milliseconds that have not reached 500 milliseconds with respect to the most immediate SBR header. This indicates that the control unit 105 detects a change point between the tunes after 200 milliseconds from the most immediate SBR header, and then, the second header inserting unit 104 inserts the SBR header after 200 milliseconds from the most immediate SBR header. Furthermore, after the second header inserting unit 104 inserts the SBR header, the first header inserting unit 103 inserts the SBR headers at regular intervals of every 500 milliseconds from the SBR header inserted by the second header inserting unit 104 as a start point.

Here, when the coded signal generated by the signal processing apparatus 1000 is reproduced, the control unit 105 controls forcible insertion of the SBR header in a frame that is likely to be a start point of the reproduction, and controls insertion of the SBR headers at predetermined intervals in frames that are not likely to be start points of the reproduction. For example, FIG. 8 is a waveform diagram illustrating an example of a change point between tunes in a stereo input PCM signal. Since a silent part of a tune is assumed to be an interval between tunes, the SBR header is inserted in a frame having such a silent part. The control unit 105 is an example of the control unit that determines, within the coded signal, insertion of the header in a frame in which the input signal has an amplitude smaller than a threshold. Since a part changed from silence to sound, such as the oval figures in FIG. 8 is assumed to be a beginning of a tune, the SBR header is more preferably inserted in a frame having such a part. As illustrated in FIG. 8, tunes are recorded in a CD so that the human ear can perceive an interval between the tunes and that a silent part continues between the tunes for a predetermined period of time. Accordingly, in the case of inserting the SBR header in a head frame of a tune, after a silent part continues for a predetermined period of time, the SBR header is inserted under the control of the control unit 105. Here, the control unit 105 is an example of the control unit that determines insertion of the header in a frame in which an amplitude of the input signal changes from being smaller than a threshold to being not less than the threshold. Furthermore, a part in which the melody varies or a "sabi (the most attractive)" part in a tune is highly likely to be indicated as a start time point of the reproduction according to the preference of a listener. In a frame having such a part, the SBR header is inserted. Here, conventional methods may be used for detecting a part where the melody varies or a "sabi" part in a tune (for example, see Japanese Unexamined Patent Application Publication No. 2001-283569 (Patent Reference 2)). A melody variation detecting unit that is not illustrated and is included in the control unit 105 is an example of a melody variation detecting unit that detects variation in a melody of the input signal, in other words, the melody variation detecting unit that detects a part in which the melody varies or a "sabi" part in a tune, using the conventional methods. Furthermore, the control unit 105 is an example of the control unit that determines insertion of the header in a frame within the coded signal. The frame corresponds to a position detected by the melody variation detecting unit as a position indicating that the melody of the input signal varies, and to a head of the "sabi" part that is detected by the melody variation detecting unit in the input signal.

Here, when the control unit 105 detects a time point of inserting the SBR header according to a state of an input signal as described above, information may be directly obtained from the input PCM signal. However, the information may be detected from a signal generated in the arithmetic processes in the first coding unit 100 and the second coding unit 101. For example, the first coding unit 100 performs an AAC encoding operation in Embodiment 1. Since information "global_gain" indicating the magnitude of a signal is generated in the AAC encoding operation, whether the amplitude of the input PCM signal is larger or smaller can be detected with reference to the information. Thus, the control unit 105 may detect an interval between tunes according to such information. Here, the first coding unit 100 is an example of the coding unit including an amplitude detecting unit that detects the amplitude of an input signal. FIG. 9 illustrates a configuration of a signal processing apparatus 2000 that determines, according to a signal generated in the arithmetic processes in the first coding unit 100, a part in which the SBR header is inserted. FIG. 9 shows the configuration of the signal processing apparatus 2000 that detects whether the amplitude of the input PCM signal is larger or smaller according to a signal generated by the first coding unit 100 and that detects an interval between tunes. Since the constituent elements included in both FIGS. 5 and 9 are previously described, the elements are labeled with the same reference numerals and the description is omitted hereinafter. The signal processing apparatus 2000 has the same constituent elements with those in FIG. 5, other than a control unit 205. The signal processing apparatus 2000 differs in the control unit 205 that detects a change point between the tunes according to global_gain that is a signal provided from the first coding unit 100. The control unit 205 is an example of the control unit that determines a frame in which the header is inserted according to the amplitude of an input signal. Here, the coding unit detects the amplitude.

Alternatively, the second coding unit 101 performs the SBR encoding using the AAC-SBR method, and in the SBR encoding, information that enables estimation of an amplitude of an input signal can be generated in Embodiment 1. With reference to the information, whether the amplitude of the input signal is larger or smaller can be detected, and an interval between tunes may be detected according to a result of the detection. FIG. 10 illustrates a configuration of a signal processing apparatus 3000 that determines, according to a signal generated in the arithmetic processes in the second coding unit 101, a part in which the SBR header is inserted. FIG. 10 shows the configuration of the signal processing apparatus 3000 that detects whether the amplitude of the input PCM signal is larger or smaller according to a signal generated in the arithmetic processes in the second coding unit 101 and that detects an interval between tunes. Since the constituent elements included in both FIGS. 5 and 10 are previously described, the elements are labeled with the same reference numerals and the description is omitted hereinafter. The signal processing apparatus 3000 has the same constituent elements with that of FIG. 5, other than a control unit 305 that detects whether the amplitude of the input PCM signal is larger or smaller according to a signal provided from the second coding unit 101 and detects a change point between the tunes.

Furthermore, information indicating an interval between tunes and information indicating a position of a "sabi" part in a tune may be obtained from an outside of the signal processing apparatus according to the present invention. FIG. 11 illustrates a configuration of a signal processing apparatus 4000 that determines, according to a control signal provided from the outside, a part in which the SBR header is inserted. FIG. 11 illustrates a configuration of the signal processing apparatus 4000 that detects, according to a control signal provided from the outside, a part in which the SBR header is inserted. Since the constituent elements included in both FIGS. 5 and 11 are previously described, the elements are labeled with the same reference numerals and the description is omitted hereinafter. Although the signal processing apparatus 4000 has the same constituent elements with those in FIG. 5, other than a control unit 405 that includes a path for obtaining from the outside a control signal indicating information that indicates an interval between tunes and information that indicates a position of a "sabi" part in a tune. The control unit 405 is an example of the control unit that determines a frame in which the header is inserted according to a control signal provided from the outside.

Hereinafter, operations of the first header inserting unit 103 and the second header inserting unit 104 will be described in detail with reference to flow charts.

FIG. 12 is a flow chart showing the operations of the first header inserting unit 103. The first header inserting unit 103 is an example of the first header inserting unit that includes a counter that updates a value in each frame, and inserts the header when a value indicated by the counter reaches a predetermined preset value. First, the first header inserting unit 103 sets an interval between which headers are inserted, to a header insertion interval register that is not illustrated and included in the first header inserting unit 103 (S1). Here, the setting is that the SBR header is inserted once every frames having a count A. Here, A is a predetermined natural number. Next, the first header inserting unit 103 resets a frame counter that updates a value in each frame (S2). Next, the first header inserting unit 103 detects whether or not the frame counter is 0 (S3). When the frame counter is 0, the SBR header is inserted in the frame in Step S4. Then, the first header inserting unit 103 increments the frame counter by 1 per frame. Furthermore, when a value of the frame counter corresponds to the frame interval A that is set in Step S1 in the beginning, the value of the frame counter is reset (S5). Unless the value of the frame counter is 0 in Step S3, the processing moves onto Step S5. In Step S5, when the value of the frame counter is incremented by 1 and the value of the frame counter corresponds to the frame interval A that is set in Step S1 as described above, the value of the frame counter is reset.

Thereby, the first header inserting unit 103 implements insertion of headers at regular intervals.

FIG. 13 is a flow chart showing the operations of the first header inserting unit 103 and the second header inserting unit 104 when functions of the second header inserting unit 104 are added to the signal processing apparatus. FIG. 13 differs from FIG. 12 in that a value indicated by a frame counter is forcibly reset according to an instruction from the control unit 105 in Steps S13 and S14 in order to enable the operations of the second header inserting unit 104, although Steps S11 and S12 in FIG. 13 are respectively the same as Steps S1 and S2 in FIG. 12. Here, the second header inserting unit 104 is an example of the second header inserting unit that inserts the header in a frame determined by the control unit using the first header inserting unit, by forcibly rewriting the value indicated by the counter to a preset value in the frame determined by the control unit. With this step, a header can singly be inserted. In other words, after the value indicated by the frame counter is reset in Step S12, the second header inserting unit 104 judges whether or not the control unit 105 instructs insertion of a header (S13), and resets the value indicated by the frame counter when the control unit 105 instructs the insertion (S14). Unless the control unit 105 instructs insertion of a header in Step S13, the processing moves onto Step S15 without any processing. Steps S15, S16, and S17 in FIG. 13 are the same as Steps S3, and S4, and S5 in FIG. 12, respectively. However, FIG. 13 differs from FIG. 12 in that the process after Step S17 returns to the process before Step S13. Thereby, the second header inserting unit 104 judges whether or not the control unit 105 instructs insertion of a header in each frame (S13), and resets the value indicated by the frame counter when the control unit 105 instructs insertion of the header (S14). In other words, the second header inserting unit 104 can insert the SBR header, independent of insertion of the headers at regular intervals by the first header inserting unit 103. Furthermore, the first header inserting unit 103 is an example of the first header inserting unit that inserts the header in each frame at a regular interval, from the frame in which the second header inserting unit 104 has inserted the header, upon insertion of the header by the second header inserting unit 104. After the second header inserting unit 104 inserts the SBR header and when the control unit 105 does not instruct insertion of a header, the first header inserting unit 103 inserts the SBR headers in each frame having the value that is indicated by the frame counter and that corresponds to the frame interval A.

Finally, the multiplexing unit 106 multiplexes a coded signal generated by the first coding unit 100, a coded signal generated by the second coding unit 101, an AAC header, and, if any, the SBR header inserted by one of the first header inserting unit 103 and the second header inserting unit 104.

Thus, the signal processing apparatus according to the present invention can insert header information necessary for reproducing a coded signal generated by the signal processing apparatus, in a start point of the reproduction. The signal processing apparatus includes: the first coding unit 100 that codes a signal in a frequency band lower than that of an input PCM signal; the second coding unit 101 that codes a signal in a frequency band higher than that of an input PCM signal; the header information storing unit 102 that stores management information of the coded signal generated by the second coding unit 101; the first header inserting unit 103 that inserts headers indicating the management information, at regular intervals; the second header inserting unit 104 that singly inserts the header; the control unit that determines which header inserting unit is used; and the multiplexing unit 106 that multiplexes the coded signal generated by the first coding unit 100, the coded signal generated by the second coding unit 101, and, if any, the header inserted by one of the first header inserting unit 103 and the second header inserting unit 104.

The limitation described in Embodiment 1 is that the first coding unit 100 is a coding unit using the AAC method out of the AAC-SBR method, the second coding unit 101 is a coding unit using the SBR method out of the AAC-SBR method, and the header to be inserted is the SBR header. However, the present invention is not limited to these. For example, the techniques of the present invention may be used for Enh-AAC-SBR method (ISO/IEC14496-3:2001/FDAM2:2004 (E) (Non-patent Reference 2)) that is an extended standard of the AAC-SBR method. In this case, the first coding unit 100 is a coding unit using the AAC method, the second coding unit 101 is a coding unit using the SBR method and the parametric stereo technique, and the header to be inserted is ps_header. Here, ps_header is a header indicating management information of coded information for enlarging channels of the coded signal for reproduction, for example, coding mode information indicating a coding method for coding Inter-channel Intensity Differences and for coding Inter-channel Coherence. In this case, the first header inserting unit 103 and the second header inserting unit 104 are examples of the first header inserting unit and the second header inserting unit that insert a header indicating management information of auxiliary data for enlarging channels of the coded signal for reproduction. Furthermore, the first header inserting unit 103 and the second header inserting unit 104 are examples of the first header inserting unit and the second header inserting unit that insert a header indicating (i) management information of auxiliary data for enlarging channels of the coded signal for reproduction and (ii) indicating coding mode information that indicates a coding method for coding the Inter-channel Intensity Differences.

In recent years, MPEG Surround (MPS) that performs compression coding on information indicating a difference between such channels is being standardized. In such a method, the management information for coding information includes management information that does not have to necessarily be inserted in all frames. In such information, a header indicating the management information has only to be inserted in a frame to be a start point of the reproduction by a reproducer, using the technique of the present invention. For example, an encoder needs to downmix an input multi-channel signal in MPEG Surround (MPS). Here, the downmix coefficient is information that does not have to necessarily be inserted in all frames.

Furthermore, in recent years, conference systems using digital communication devices have been developed. Thus, a coding method that has a layer structure that is a premise of the present invention will be presumably used as an audio transmission method. For example, such coding methods include: coding a signal by dividing it into a lower frequency band layer and a higher frequency band layer, such as the AAC-SBR method; and coding a downmix signal and a signal obtained by converting the downmix signal to multi-channels in different layers as in MPS. With use of such coding methods, a transmission method can be appropriately selected according to a situation. For example, when there is enough transmission capacity in a communication path, all layers of a signal are transmitted. Unless there is such enough transmission capacity, the signal is transmitted by erasing several sub-layers of the signal.

Furthermore, when the first coding unit 100 and the second coding unit 101 generate an audio coded signal to be multiplexed onto a broadcast wave, the control unit may detect whether a content corresponding to the broadcast wave is a television commercial or a television program and insert the SBR header, a MPS downmix coefficient, or ps_header in a frame that switches to the television program. Here, the control unit is an example of the control unit that includes a broadcast content detecting unit that detects whether a content corresponding to a broadcast wave is a television commercial or a television program, and that determines insertion of the header in a frame that switches from the television commercial to the television program.

Similarly, when the first coding unit 100 and the second coding unit 101 generate an audio coded signal to be multiplexed onto a broadcast wave, there are cases where audio information to be coded is recorded by a microphone. For example, such cases include recording voice of a solo singer using a microphone, and recording instrumental accompaniment of a back-up band and voice of background chorus using another microphone. When the voice of the solo singer is recorded after introduction of the back-up band, it is highly likely that the reproduction may start from audio information of the singer. Thus, when a state of coding audio information obtained by mainly recording instrumental accompaniment of a back-up band and voice of background chorus transitions to a state of coding audio information obtained by mainly recording voice of a solo singer, the control unit may detect a frame corresponding to a position of switching such audio information, by switching a microphone that records the audio information, and may determine insertion of the SBR header in the detected frame. Here, the control unit is an example of the control unit that determines insertion of the header in a position of switching audio information that is a content of the input signal.

More specifically, the control unit is an example of the control unit that: (i) detects whether the coding unit codes audio information obtained by mainly recorded by a first microphone or a second microphone when the coding unit codes audio information recorded by at least 2 microphones including the first microphone and the second microphone; and (ii) determines insertion of the header in a head frame that is switched to audio information recorded by the second microphone when the control unit detects a transition from a state where the coding unit codes audio information recorded by the first microphone to a state where the coding unit codes the audio information recorded by the second microphone.

In the aforementioned example, the control unit detects a frame that is highly likely to be a head frame from which the reproduction starts by making a distinction between the microphones that record audio information. However, the control unit may detect such a frame by making a distinction between cameras that record image information, when the first coding unit 100 generates an audio coded signal to be multiplexed onto a broadcast wave that broadcasts audio information and when the second coding unit 101 generates an image coded signal to be multiplexed onto a broadcast wave that broadcasts the image information. In this case, the control unit is an example of the control unit that determines insertion of the header in a frame that corresponds to a position of the input signal when image information is switched, within the coded signal. More specifically, the control unit is an example of the control unit that detects whether the image information is recorded by a first camera or a second camera when the image information is recorded by at least 2 cameras including the first camera and second camera, and determines insertion of the header in a frame corresponding to a position in which the control unit detects a transition from a state where the image information is recorded by the first camera to a state where the image information is recorded by the second camera.

Although management information of sub-layers does not necessarily have to be transmitted to all frames according to a coding method with a layer structure, as in the AAC-SBR method and MPS, there are cases where the management information of sub-layers needs to be singly inserted in some interactive devices predicated on communications in response to a request from a receiver. Such case holds true for not only an audio coded signal but also an image coded signal. For example, when a one-to-one teleconference joins an additional site, a decoder of the additional site needs management information of sub-layers of the audio coded signal and the image coded signal at a timing when the number of joining sites increases. Otherwise, the decoder needs to wait for management information to be regularly transmitted. Furthermore, when an error occurs in a communication path and the decoder cannot normally receive a signal, the decoder needs to notify the sender of such a state and to force the sender to transmit management information. In such a case, the management information can be forcibly inserted by inserting control information from the outside, in the configuration illustrated in FIG. 11 of Embodiment 1.

Furthermore, when prediction coding is performed, in image coding and audio coding, on a difference between data that has been previously coded and data to be coded, upon start of reproduction from some midpoint of data subject to the prediction coding, the coded image and coded audio cannot correctly be decoded, because no data that has been previously coded is available. Thus, when it is probable that reproduction starts from some midpoint of coded data obtained by performing prediction coding, management information (a reset sign) indicating reset of prediction coding may be inserted in the midpoint, as the BS header (Japanese Unexamined Patent Application Publication No. 2006-106475 (Patent Reference 3)). In this case, the first coding unit 100 and the second coding unit 101 are examples of the coding unit that performs prediction coding on residual information between a frame to be coded and a frame that has been coded before the frame to be coded that are included in the input signal. Furthermore, the control unit is an example of the control unit that determines a frame from which reproduction is highly likely to be started, as a frame in which the header is inserted, when the coding unit performs prediction coding on an input signal and it is probable that reproduction starts from some midpoint of the coded signal obtained by performing prediction coding on the input signal.

Each functional block in the block diagrams (such as FIGS. 5, 9, 10, and 11) is representatively embodied as an LSI that is an integrated circuit. These blocks may be made into separate single chips, or may be made as a single chip to include part of or all thereof. For example, the functional blocks other than a memory may be made into a separate single chip.

Although the LSI is exemplified herein, there are cases where an IC, a system LSI, a super LSI, or a ultra LSI may be used due to a difference in an integration degree.

Furthermore, the means for integrating circuits is not limited to an LSI, but may be embodied by a dedicated circuit or a general purpose processor. It is also acceptable to use a field programmable gate array (FPGA) that is programmable after the LSI has been manufactured, and a reconfigurable processor in which connections and settings of circuit cells within the LSI are reconfigurable.

Furthermore, when integrated circuit technology that replaces LSIs appears through progress in the semiconductor technology or other derived technology, that technology can naturally be used to integrate the functional blocks. Biotechnology is anticipated to be applied to the integrated circuit technology.

Among the functional blocks, only a unit for storing data to be coded or decoded may be excluded from integration into a single chip and may be configured otherwise.

INDUSTRIAL APPLICABILITY

The signal processing apparatus according to the present invention relates to a coding apparatus that generates a coded signal having a layer structure. The signal processing apparatus can appropriately insert header information of sub-layers in a start point of the reproduction by a reproducer, by inserting the header information at regular intervals or singly. As a result, a high quality sound can be reproduced from the start point of the reproduction. For example, the signal processing apparatus is applicable to sound reproduction equipment according to the AAC-SBR method and MPEG Surround.

The invention claimed is:

1. A signal processing apparatus, comprising:
a processor; and
a non-transitory memory having stored thereon executable instructions, which when executed by the processor, cause the processor to perform:
coding an input signal on a per frame basis;
inserting a header in each frame at a regular interval within a coded signal, the coded signal being generated in said coding and being represented by a sequence of frames, and the header indicating management information of the coded signal;
determining a frame in which the header is to be inserted, independent of the frames in which the header is inserted in said inserting; and
singly inserting the header in the frame determined in said determining,
wherein the header, which is inserted in said inserting and said singly inserting, indicates management information of auxiliary data for enlarging channels of the coded signal for reproduction, and
wherein the header, which is inserted in said inserting and said singly inserting, (i) indicates the management information of auxiliary data for enlarging channels of the coded signal for reproduction and (ii) includes coding mode information indicating a coding method for coding Inter-channel Intensity Differences.

2. A signal processing apparatus, comprising:
a processor; and a non-transitory memory having stored thereon executable instructions, which when executed by the processor, cause the processor to perform:
coding an input signal on a per frame basis;
inserting a header in each frame at a regular interval within a coded signal, the coded signal being generated in said coding and being represented by a sequence of frames, and the header indicating management information of the coded signal;
determining a frame in which the header is to be inserted, independent of the frames in which the header is inserted in said inserting; and
singly inserting the header in the frame determined in said determining,
wherein the header, which is inserted in said inserting and said singly inserting, indicates management information of auxiliary data for enlarging channels of the coded signal for reproduction, and wherein the header, which is inserted in said inserting and said singly inserting, (i) indicates the management information of auxiliary data for enlarging channels of the coded signal for reproduction and (ii) includes coding mode information indicating a coding method for coding Inter-channel Coherence.

3. A method for processing a signal, said method comprising:
coding an input signal on a per frame basis;
inserting, using a processor, a header in each frame at a regular interval within a coded signal, the coded signal being generated in said coding and being represented by a sequence of frames, and the header indicating management information of the coded signal;
determining a frame in which the header is to be inserted, independent of the frames in which the header is inserted in said inserting; and
singly inserting the header in the frame determined in said determining,
wherein the header, which is inserted in said inserting and said singly inserting, indicates management information of auxiliary data for enlarging channels of the coded signal for reproduction, and
wherein the header, which is inserted in said inserting and said singly inserting, (i) indicates the management information of auxiliary data for enlarging channels of the coded signal for reproduction and (ii) includes coding mode information indicating a coding method for coding Inter-channel Intensity Differences.

4. A non-transitory computer readable recording medium having stored thereon a program, wherein, when executed, said program causes a computer to perform:
coding an input signal on a per frame basis;
inserting a header in each frame at a regular interval within a coded signal, the coded signal being generated in said coding and being represented by a sequence of frames, and the header indicating management information of the coded signal;
determining a frame in which the header is to be inserted, independent of the frames in which the header is inserted in said inserting; and
singly inserting the header in the frame determined in said determining,
wherein the header, which is inserted in said inserting and said singly inserting, indicates management information of auxiliary data for enlarging channels of the coded signal for reproduction, and
wherein the header, which is inserted in said inserting and said singly inserting, (i) indicates the management information of auxiliary data for enlarging channels of the coded signal for reproduction and (ii) includes coding mode information indicating a coding method for coding Inter-channel Intensity Differences.

5. An integrated circuit, comprising:
a processor; and
a non-transitory memory having stored thereon executable instructions, which when executed by the processor, cause the processor to perform:
coding an input signal on a per frame basis;
inserting a header in each frame at a regular interval within a coded signal, the coded signal being generated in said coding and being represented by a sequence of frames, and the header indicating management information of the coded signal;
determining a frame in which the header is to be inserted, independent of the frames in which the header is inserted in said inserting; and
singly inserting the header in the frame determined in said determining, wherein the header, which is inserted in said inserting and said singly inserting, indicates management information of auxiliary data for enlarging channels of the coded signal for reproduction, and wherein the header, which is inserted in said inserting and said singly inserting, (i) indicates the management information of auxiliary data for enlarging channels of the coded signal for reproduction and (ii) includes coding mode information indicating a coding method for coding Inter-channel Intensity Differences.

6. A method for processing a signal, said method comprising:

coding an input signal on a per frame basis;

inserting, using a processor, a header in each frame at a regular interval within a coded signal, the coded signal being generated in said coding and being represented by a sequence of frames, and the header indicating management information of the coded signal;

determining a frame in which the header is to be inserted, independent of the frames in which the header is inserted in said inserting; and singly inserting the header in the frame determined in said determining, wherein the header, which is inserted in said inserting and said singly inserting, indicates management information of auxiliary data for enlarging channels of the coded signal for reproduction, and wherein the header, which is inserted in said inserting and said singly inserting, (i) indicates the management information of auxiliary data for enlarging channels of the coded signal for reproduction and (ii) includes coding mode information indicating a coding method for coding Inter-channel Coherence.

7. A non-transitory computer readable recording medium having stored thereon a program, wherein, when executed, said program causes a computer to perform:

coding an input signal on a per frame basis;

inserting a header in each frame at a regular interval within a coded signal, the coded signal being generated in said coding and being represented by a sequence of frames, and the header indicating management information of the coded signal;

determining a frame in which the header is to be inserted, independent of the frames in which the header is inserted in said inserting; and singly inserting the header in the frame determined in said determining, wherein the header, which is inserted in said inserting and said singly inserting, indicates management information of auxiliary data for enlarging channels of the coded signal for reproduction, and wherein the header, which is inserted in said inserting and said singly inserting, (i) indicates the management information of auxiliary data for enlarging channels of the coded signal for reproduction and (ii) includes coding mode information indicating a coding method for coding Inter-channel Coherence.

8. An integrated circuit, comprising:

a processor; and a non-transitory memory having stored thereon executable instructions, which when executed by the processor, cause the processor to perform:

coding an input signal on a per frame basis;

inserting a header in each frame at a regular interval within a coded signal, the coded signal being generated in said coding and being represented by a sequence of frames, and the header indicating management information of the coded signal;

determining a frame in which the header is to be inserted, independent of the frames in which the header is inserted in said inserting; and singly inserting the header in the frame determined in said determining, wherein the header, which is inserted in said inserting and said singly inserting, indicates management information of auxiliary data for enlarging channels of the coded signal for reproduction, and wherein the header, which is inserted in said inserting and said singly inserting, (i) indicates the management information of auxiliary data for enlarging channels of the coded signal for reproduction and (ii) includes coding mode information indicating a coding method for coding Inter-channel Coherence.

* * * * *